(12) United States Patent
Shiotani et al.

(10) Patent No.: US 8,678,509 B2
(45) Date of Patent: Mar. 25, 2014

(54) SEAT BELT RETRACTOR AND SEAT BELT APPARATUS INCLUDING THE SAME

(75) Inventors: Masahiro Shiotani, Tokyo (JP); Yusuke Iura, Tokyo (JP)

(73) Assignee: Takata Corporation, Tokyo (JP)

( * ) Notice: Subject to any disclaimer, the term of this patent is extended or adjusted under 35 U.S.C. 154(b) by 534 days.

(21) Appl. No.: 12/963,548

(22) Filed: Dec. 8, 2010

(65) Prior Publication Data

US 2011/0140502 A1    Jun. 16, 2011

(30) Foreign Application Priority Data

Dec. 15, 2009   (JP) ................................. 2009-283842

(51) Int. Cl.
*B60R 22/42* (2006.01)

(52) U.S. Cl.
USPC ........................... 297/479; 297/480; 242/374

(58) Field of Classification Search
USPC .......... 297/474, 475, 476, 479, 480; 242/374; 280/806
See application file for complete search history.

(56) References Cited

U.S. PATENT DOCUMENTS

| | | | |
|---|---|---|---|
| 4,261,531 A * | 4/1981 | Naitoh | 242/385 |
| 4,295,684 A * | 10/1981 | Naitoh | 297/475 |
| 6,419,176 B1 * | 7/2002 | Mizuno | 242/374 |
| 6,419,272 B1 * | 7/2002 | Yamaguchi et al. | 280/806 |
| 7,429,012 B2 * | 9/2008 | Löffler et al. | 242/374 |
| 8,220,735 B2 * | 7/2012 | Wang et al. | 242/374 |
| 2002/0053621 A1 | 5/2002 | Shiotani et al. | |
| 2004/0095010 A1 * | 5/2004 | Strobel | 297/475 |
| 2008/0017743 A1 * | 1/2008 | Hiramatsu et al. | 242/379.1 |
| 2010/0066150 A1 * | 3/2010 | Mori et al. | 297/475 |
| 2010/0084906 A1 * | 4/2010 | Burrow et al. | 297/476 |

(Continued)

FOREIGN PATENT DOCUMENTS

| | | |
|---|---|---|
| DE | 100 66 249 B4 | 7/2007 |
| DE | 10 2008 032 371 A1 | 9/2009 |

(Continued)

OTHER PUBLICATIONS

Communication (EP Search Report) in EP Appln No. 10193441.2 dated Nov. 30, 2011.

(Continued)

*Primary Examiner* — David R Dunn
*Assistant Examiner* — Timothy J Brindley
(74) *Attorney, Agent, or Firm* — Foley & Lardner LLP (57) ABSTRACT

To effectively operate a pretensioner using a plurality of balls and an energy absorption mechanism, to simplify the structure of an exhaust passage in the pretensioner, and to facilitate the working process of the exhaust passage. A pretensioner 15 includes a plurality of balls 20 serving as force transmission members and a piston 21 in a pipe 17. A piston body 21a of the piston 21 includes a shaft portion 21c and a substantially hemispherical head portion 21d. The piston body 21a is provided with an exhaust hole 21e extending in the axial direction and exhaust grooves 21f communicating with the exhaust hole 21e that define an exhaust passage. The exhaust grooves 21f prevent the exhaust hole 21e from being closed even if the head portion 21d of the piston 21 contacts the ball 20. Since the exhaust hole 21e and the exhaust grooves 21f are simply provided in the piston body 21a formed as a single member, the structure of the exhaust passage is simple, and working of the exhaust passage is easy.

4 Claims, 7 Drawing Sheets

(56) References Cited

U.S. PATENT DOCUMENTS

| | | | |
|---|---|---|---|
| 2010/0176649 A1* | 7/2010 | Kohama | 297/474 |
| 2011/0031800 A1* | 2/2011 | Motozawa | 297/475 |
| 2011/0140503 A1* | 6/2011 | Hiramatsu et al. | 297/475 |
| 2012/0248847 A1* | 10/2012 | Shiotani et al. | 297/479 |

FOREIGN PATENT DOCUMENTS

| | | |
|---|---|---|
| JP | 10-067300 | 3/1998 |
| JP | 2000-052918 | 2/2000 |
| JP | 2001-063519 | 3/2001 |
| JP | 2001-063520 | 3/2001 |
| JP | 2002-067878 | 3/2002 |
| JP | 2002-274325 | 9/2002 |
| JP | 2002-347574 | 12/2002 |
| JP | 2003-267186 | 9/2003 |
| JP | 2005-024010 | 1/2005 |
| JP | 2007-302074 A | 11/2007 |
| JP | 2009-173087 | 8/2009 |

OTHER PUBLICATIONS

Notice of Rejection Japanese Application No. JP 2009-283842 dated Apr. 17, 2013.

* cited by examiner

SEAT BELT RETRACTOR AND SEAT BELT APPARATUS INCLUDING THE SAME

TECHNICAL FIELD

The present invention belongs to a technical field of a seat belt retractor including a pretensioner and an energy absorption (EA) mechanism and to a technical field of a vehicle seat belt apparatus.

BACKGROUND ART

For seat belt apparatuses to be mounted in vehicles such as cars, various seat belt retractors including a pretensioner have been developed. In an initial stage of an emergency, such as a vehicle collision, when a deceleration higher than the normal deceleration is applied to the vehicle, a pretensioner rotates a spool of a seat belt retractor in a seat-belt retracting direction by using reaction gas generated by a gas generator, thereby winding a seat belt around the spool. This quickly removes slack from the seat belt and applies tension to the seat belt so as to increase the occupant restraint force.

As an example of a pretensioner of the related art, there is known a pretensioner in which a plurality of balls serving as force transmission members and a piston are stored in a pipe. The piston pushes these balls by receiving gas pressure of reaction gas generated by a gas generator in the event of an emergency, and thereby moves the balls along the interior of the pipe so as to press a plurality of pressed portions of a ring gear. When the ring gear is rotated by the press of the balls, a spool rotates in a seat-belt retracting direction to retract the seat belt (for example, see PTL 1).

In the pretensioner described in PTL 1, the pipe is provided with a gas release hole that connects the interior and exterior of the pipe so as to prevent the gas pressure in the pipe between the gas generator and the piston from excessively increasing.

As another example of a pretensioner of the related art, there is also known a pretensioner in which a rack and a piston serving as force transmission members are provided in a cylinder hole. The piston pushes the rack by receiving gas pressure of reaction gas generated by a gas generator in the event of an emergency. The movement of the rack causes rack teeth to rotate a pinion, and the rotation of the pinion rotates a spool in the seat-belt retracting direction so as to retract the seat belt (for example, see PTL 2).

In the pretensioner described in PTL 2, the piston and the rack respectively have exhaust holes that allow a gas generator side of the piston and a rack teeth side of the rack to communicate with each other.

In addition, in the seat belt retractor, when withdrawal of the seat belt is locked in the above-described event of the emergency, a great tension acts on the seat belt because of the inertia of the occupant. As a reaction force of the tension of the seat belt, a great force is applied from the seat belt to the occupant. Accordingly, there is also known a seat belt retractor including an energy absorption (EA) mechanism for limiting (suppressing) the force from the seat belt to the occupant (for example, see PTL 1 and PTL 2). As an EA member of the EA mechanism, for example, a torsion bar is often used. When the seat belt is almost withdrawn by the inertia of the occupant, the torsion bar is subjected to torsional deformation, absorbs the kinetic energy of the occupant, and limits the force applied from the seat belt to the occupant.

The EA mechanism starts subsequently to the completion of the seat-belt retracting operation of the pretensioner. When the EA mechanism performs the EA operation, the spool almost rotates in the seat-belt withdrawing direction, and therefore, the above-described force transmission members and the piston move in a direction opposite the moving direction during the operation of the pretensioner. Thus, the pressure in the pipe or the cylinder hole between the gas generator and the piston increases, and the piston receives resistance due to the increased gas pressure during movement.

Accordingly, in the seat belt retractor described in PTL 1, gas in the pipe between the gas generator and the piston flows outside through the gas release hole during the EA operation, so that the above-described resistance decreases. Further, in the seat belt retractor described in PTL 2, gas in the cylinder hole between the gas generator and the piston flows toward the rack teeth of the rack through the exhaust hole during the EA operation, so that the above-described resistance decreases.

CITATION LIST

Patent Literature

[PTL 1] Japanese Unexamined Patent Application Publication No. 2001-63520
[PTL 2] Japanese Unexamined Patent Application Publication No. 10-67300

SUMMARY OF INVENTION

Technical Problem

When the pipe has the gas release hole, as in the description of PTL 1, the gas flows out of the pipe. Accordingly, to prevent the gas from flowing out of the pipe, it is conceivable to apply the technique of the exhaust holes provided in the piston and the rack of the pretensioner described in PTL 2 to the pretensioner described in PTL 1.

However, while the pretensioner of PTL 1 uses a plurality of balls as the force transmission members, the pretensioner of PTL 2 uses the rack as the force transmission member. Hence, it is difficult to simply apply the technique of the exhaust holes of PTL 2 to the pretensioner of PTL 1.

That is, since the pretensioner of PTL 2 uses the piston and the rack, a guide portion to be guided by the cylinder hole needs to be provided integrally with a base end of the rack for the purpose of stable movement of the rack. In the pretensioner of PTL 2, the piston is divided in two, that is, into a piston body and a pressure receiving plate, and the piston body is provided integrally with the rack to serve as the guide portion of the rack. When the piston body to be guided by the cylinder hole is thus provided integrally with the base end of the rack, the exhaust hole needs to be provided in the piston body and the rack. Moreover, since the rack serving as the force transmission member is formed long in the moving direction thereof, the exhaust hole provided in the rack needs to be formed in a T-shape defined by a hole extending in the moving direction of the rack and a hole extending in a direction orthogonal to the moving direction of the rack. In addition, the piston body and the pressure receiving plate spaced each other need to have respective exhaust holes, the number of portions worked to form exhaust holes increases, and it is necessary to reliably ensure a communication state between the exhaust holes. For this reason, not only the structures of the exhaust holes are complicated, but also working for the exhaust holes is troublesome. This increases the cost.

The present invention has been made in view of these circumstances, and an object of the invention is to provide a seat belt retractor that effectively operates a pretensioner using a plurality of balls serving as force transmission members and an energy absorption mechanism and that allows production at a lower cost by simplifying the structure of an exhaust passage of the pretensioner and facilitating the working process of the exhaust passage, and a seat belt apparatus including the seat belt retractor.

Solution to Problem

In order to solve the above-described problems, a seat belt retractor according to the present invention includes at least a seat belt; a spool that retracts the seat belt; a locking member that corotates with the spool in a normal state and that is inhibited from rotating in a seat-belt withdrawing direction in the event of an emergency so as to produce relative rotation with respect to the spool; a lock mechanism that locks the rotation of the locking member in the seat-belt withdrawing direction in the event of the emergency; an energy absorption mechanism that is provided between the spool and the locking member and that limits a load applied to the seat belt during the relative rotation between the spool and the locking member; and a pretensioner that operates in the event of the emergency so as to rotate the spool in a seat-belt retracting direction. The pretensioner includes at least a case, a pipe attached to the case, a predetermined number of balls that are movably provided in the pipe and that transmit a force for rotating the spool in the seat-belt retracting direction, a gas generator that generates gas in the event of the emergency, a piston that is movably provided in the pipe and that is moved by pressure of the gas so as to push the balls, a ring gear that is at least rotatably provided in the case and that has a plurality of internal teeth on an inner periphery and a plurality of pressed portions on an outer periphery, the pressed portions being pressed by the balls, and a pinion that is provided at a spool side member in the case, that has external teeth to be meshed with the internal teeth of the ring gear, and that rotates the spool. The piston includes an exhaust passage that allows a side of the piston close to the gas generator to communicate with a side of the piston close to the balls. The exhaust passage is defined by an exhaust hole extending in an axial direction of the piston, and an exhaust groove provided at an end of the piston in contact with the balls and extending in a radial direction of the piston, the exhaust groove communicating with the exhaust hole.

In the seat belt retractor of the present invention, the end of the piston in contact with the balls has any one of a substantially spherical shape, a truncated conical shape, and a substantially planar shape.

Further, in the seat belt retractor of the present invention, the piston includes a piston body and a piston ring fitted on the piston body, and the exhaust passage is provided in the piston body.

A seat belt apparatus according to the present invention includes at least a seat belt retractor that retracts a seat belt; a tongue slidably supported by the seat belt withdrawn from the seat belt retractor; and a buckle by which the tongue is disengageably retained, the buckle being provided in a vehicle body. The seat belt retractor is any one of the above-described seat belt retractors of the present invention.

Advantageous Effects of Invention

According to the seat belt retractor of the present invention having this configuration, the piston that pushes a predetermined number of balls serving as the force transmission members is provided with the exhaust hole extending in the axial direction, and the ball contact end of the piston is provided with the exhaust groove that extends in the radial direction and that communicates with the axial exhaust hole. Therefore, when the pretensioner in an operation state, part of the gas pressure in the pipe between the gas generator and the piston flows toward the ball side of the piston through the exhaust hole and the exhaust groove. This can prevent the gas pressure in the pipe between the gas generator and the piston from excessively increasing.

Since the piston is also returned together with the balls by the energy absorption operation, the pressure in the pipe on the gas generator side of the piston increases. However, since the piston has the exhaust hole and the exhaust groove, the gas in the pipe on the gas generator side can flow toward the ball side of the piston through the exhaust hole and the exhaust groove. Therefore, it is possible to suppress the resistance of the gas to the return of the piston. This allows smoother movement of the piston and smoother rotation of the ring gear in the seat-belt withdrawing direction. As a result, the EA operation can be even more effectively performed by the energy absorption mechanism.

In addition, the exhaust passage defined by the exhaust hole and the exhaust groove is provided only in the piston, but is not provided in the balls serving as the force transmission members. Thus, the structure of the exhaust passage in the pretensioner is simplified, and the working process of the exhaust passage is facilitated. As a result, the pretensioner can be produced at low cost, and the cost of the seat belt retractor including the pretensioner can be reduced.

In this way, it is possible to realize a seat belt retractor that effectively operates a pretensioner using a plurality of balls serving as force transmission members and an energy absorption mechanism and that allows production at a lower cost by simplifying the structure of an exhaust passage of the pretensioner and facilitating working of the exhaust passage.

In particular, since the exhaust groove of the exhaust passage is provided at the end of the piston in contact with the ball, even if the ball contacts this end of the piston, the exhaust groove can prevent the exhaust hole from being closed by the ball. Moreover, it is only necessary to subject the end of the piston to grooving. This further facilitates the working process of the exhaust passage.

Since the end of the piston in contact with the ball has a substantially spherical shape, a truncated conical shape, or a substantially planer shape, even if the ball contacts the end of the piston, the contact area between the ball and the end can be made considerably small. This can more effectively prevent the exhaust hole from being closed by the ball when the ball contacts the end. In particular, since the end of the piston has a substantially spherical shape or a truncated conical shape, it is possible to more effectively prevent closing of the exhaust hole and to more smoothly move the piston in the curved pipe.

In contrast, according to the seat belt apparatus including the seat belt retractor of the present invention, the seat belt retractor can effectively operate the pretensioner and the energy absorption mechanism. Hence, the occupant restraint performance of the seat belt apparatus is enhanced effectively.

BRIEF DESCRIPTION OF DRAWINGS

FIG. 2($a$) is a left side view of the seat belt retractor of the embodiment, and FIG. 2($b$) is a cross-sectional view taken along line IIB-IIB in FIG. 2($a$).

FIGS. 7(a), 7(b), and 7(c) illustrate the operation of the pretensioner.

DESCRIPTION OF EMBODIMENTS

An embodiment of the present invention will be described below with reference to the drawings.

Figure 1:
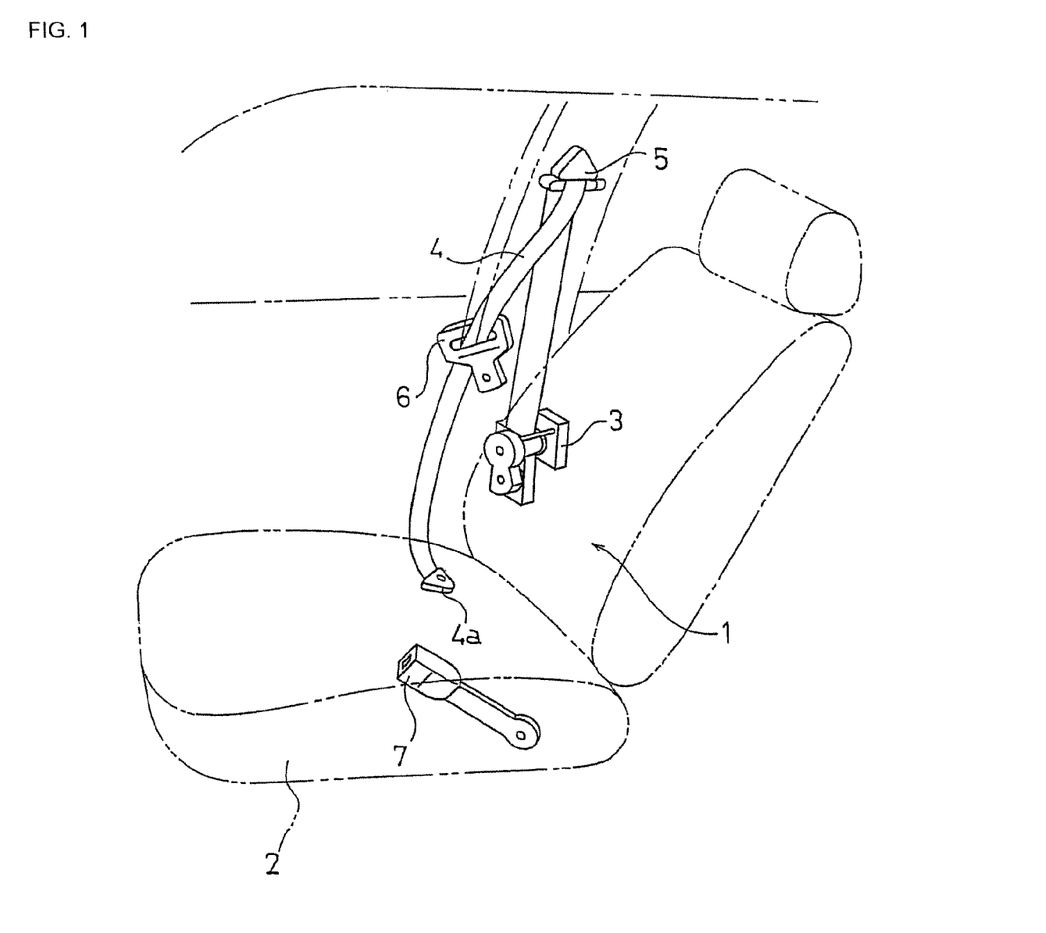
FIG. 1 schematically shows a seat belt apparatus including a seat belt retractor according to an embodiment of the present invention.

FIG. 1 schematically illustrates a seat belt apparatus including a seat belt retractor according to an embodiment of the present invention.

As illustrated in FIG. 1, a seat belt apparatus 1 of the embodiment is basically the same as a known three-point seat belt apparatus. In the figure, reference numeral 1 denotes the seat belt apparatus, numeral 2 denotes a vehicle seat, numeral 3 denotes a seat belt retractor provided near the vehicle seat 2, numeral 4 denotes a seat belt that is withdrawn and retracted by the seat belt retractor 3 and that has a belt anchor 4a provided at a leading end thereof and fixed to the floor of the vehicle body or the vehicle seat 2, numeral 5 denotes a guide anchor that guides the seat belt 4, which is withdrawn from the seat belt retractor 3, toward the shoulder of an occupant, numeral 6 denotes a tongue slidably supported by the seat belt 4 guided from the guide anchor 5, and numeral 7 denotes a buckle which is fixed to the floor of the vehicle body or the vehicle seat in a manner such that the tongue 6 is disengageably inserted in and engaged with the buckle 7.

Operations of buckling and unbuckling the seat belt 4 in the seat belt apparatus 1 are also the same as those adopted in the known seat belt apparatus.

The seat belt retractor 3 of the embodiment is formed as a known emergency locking seat belt retractor (ELR) or a known automatic locking seat belt retractor (ALR). This seat belt retractor 3 includes a pretensioner and an energy absorption (EA) mechanism.

Figure 2:
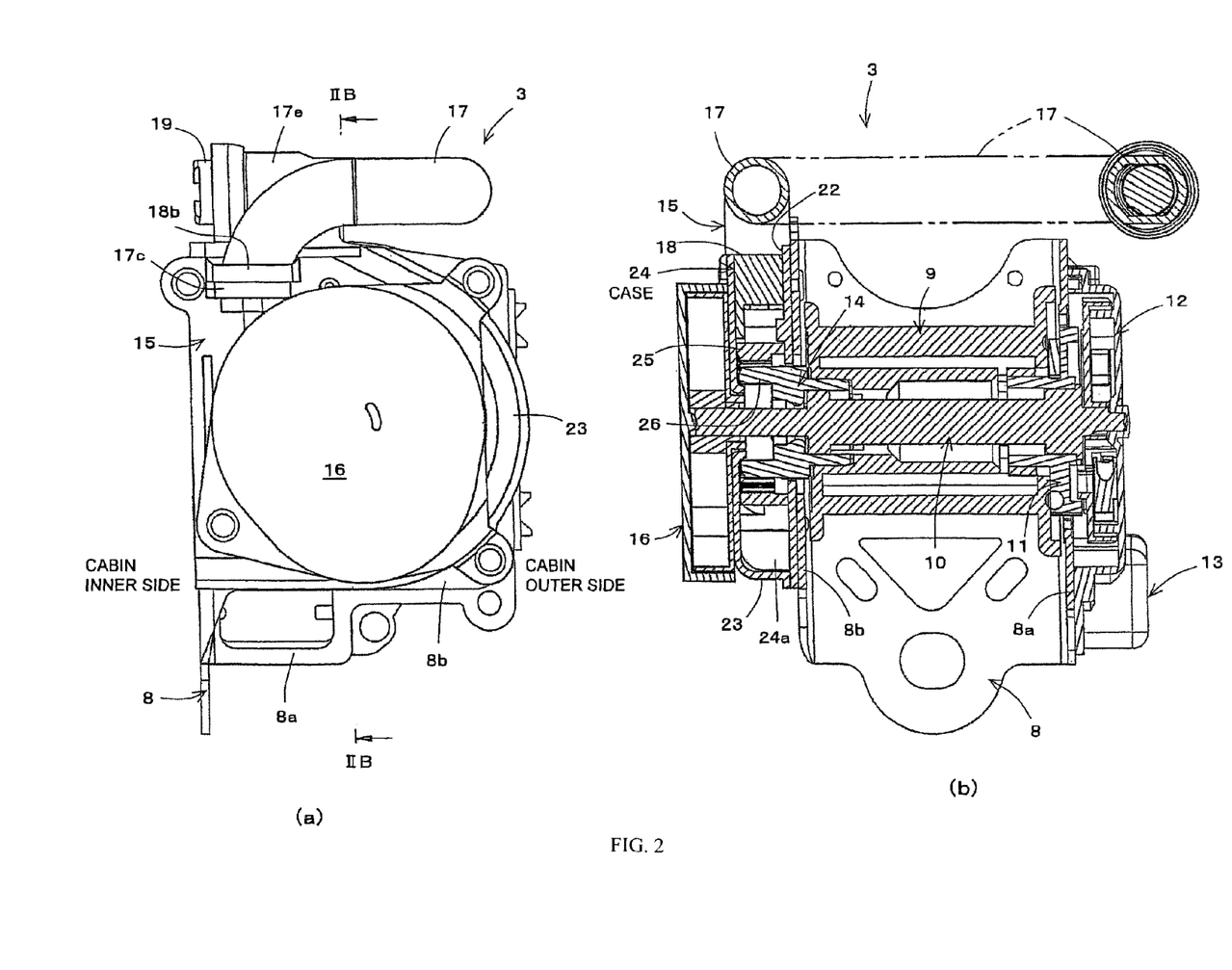

FIGS. 2(a) and 2(b) illustrate the seat belt retractor of the embodiment including the pretensioner and the EA mechanism.

For example, the seat belt retractor 3 of the embodiment is basically the same as the above-described known seat belt retractor including the pretensioner and the EA mechanism that is described in PTL 1. Therefore, first, a brief description will be given of the same structures and operations as those adopted in the seat belt retractor described in PTL 1.

As illustrated in FIGS. 2(a) and 2(b), the seat belt retractor 3 includes an angular U-shaped frame 8 having both side walls 8a and 8b, a spool 9 that retracts the seat belt 4, a torsion bar 10 of the EA mechanism, a locking base 11 serving as the locking member of the present invention, a lock mechanism 12, a deceleration detecting mechanism 13, a cylindrical connecting member 14, a pretensioner 15 using a predetermined number of (a plurality of) balls, and a spring means 16 that always biases the spool 9 in a seat-belt retracting direction. While the spool 9 and the connecting member 14 are separately provided in the seat belt retractor 3 of the embodiment, the spool 9 and the connecting member 14 are integrally provided in PTL 1.

In a normal state in which the deceleration detecting mechanism 13 and the pretensioner 15 do not operate, when the seat belt 4 is withdrawn, the spool 9 rotates in a seat-belt withdrawing direction, so that the seat belt 4 is withdrawn. Since the deceleration detecting mechanism 13 does not operate in this normal withdrawal of the seat belt 4, the lock mechanism 12 does not operate, and the spool 9 rotates together with the connecting member 14, the torsion bar 10, and the locking base 11. Therefore, the seat belt 4 is withdrawn easily.

When the hand is released from the seat belt 4 after withdrawing the seat belt 4, the spool 9 is rotated in the seat-belt retracting direction by biasing force of the spring means 16 transmitted via the connecting member 14. Then, the spool 9 retracts all or almost all of the withdrawn portion of the seat belt 4. During this normal retraction of the seat belt 4, the spool 9 rotates together with the connecting member 14, the torsion bar 10, and the locking base 11. Therefore, the seat belt 4 is retracted easily.

If a deceleration such as to start the deceleration detecting mechanism 13 is applied to the vehicle during running, the deceleration detecting mechanism 13 starts and the lock mechanism 12 also starts. Then, an unillustrated pawl provided in the locking base 11 turns into engagement with unillustrated lock teeth provided on the side wall 8a. This locks the rotation of the locking base 11 in the seat-belt withdrawing direction. On the other hand, the seat belt 4 is almost withdrawn by the inertia of the occupant, and the spool 9 almost rotates relative to the locking base 11 in the seat-belt withdrawing direction. As a result, the torsion bar 10 is twisted. The resistance due to torsional deformation of the torsion bar 10 suppresses the rotation of the spool 9 in the seat-belt withdrawing direction. In this way, the occupant is restrained by the seat belt 4. In this case, the kinetic energy of the occupant is partially absorbed by the torsional deformation of the torsion bar 10, and therefore, the force applied from the seat belt 4 to the occupant is limited.

Since other basic structures and other basic operations of the seat belt retractor 3 of the embodiment can be easily understood by reference to the description of PTL 1, detailed descriptions thereof are omitted.

Next, a description will be given of a characteristic structure of the seat belt retractor 3 of the embodiment, that is, the pretensioner 15 of the embodiment.

Figure 3:
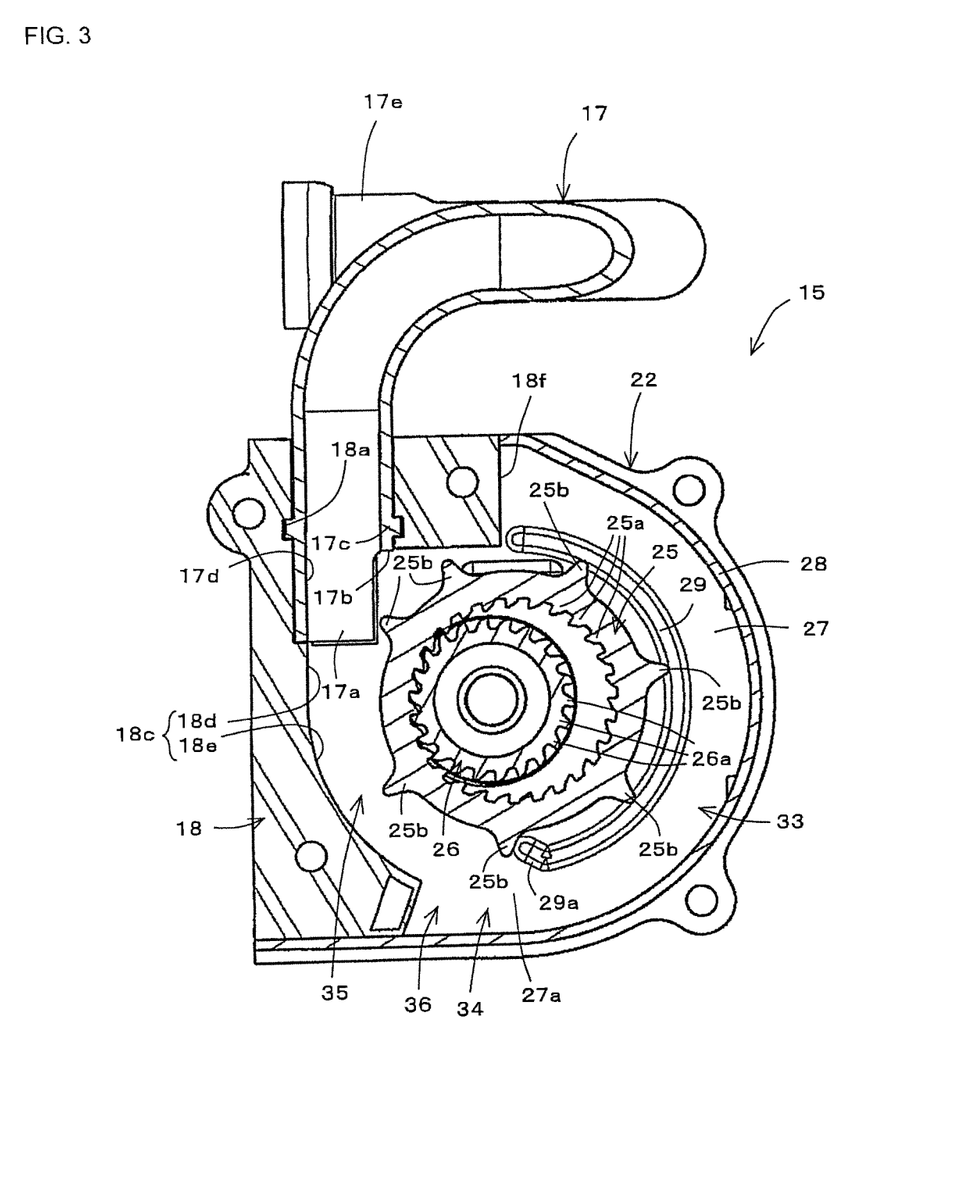
FIG. 3 illustrates a pretensioner of the seat belt retractor of FIG. 2(a) from which a cover, balls, and a spring means are removed.
Figure 4:
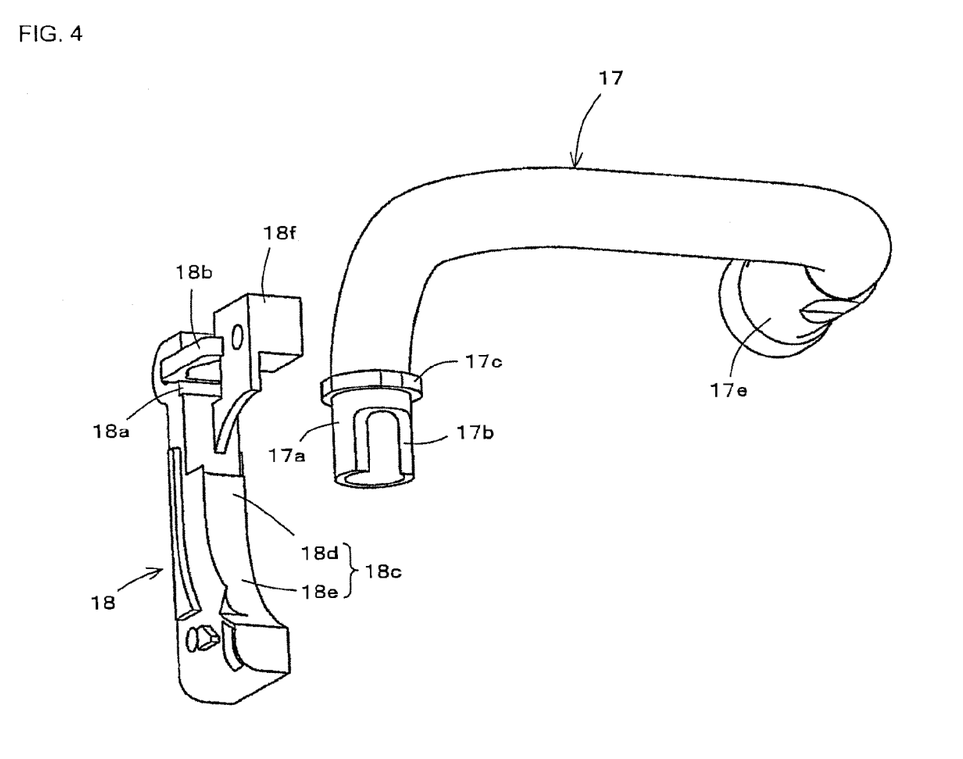
FIG. 4 is an exploded perspective view illustrating a pipe and a guide member in the pretensioner of the embodiment.

FIG. 3 illustrates the pretensioner of the seat belt retractor in FIG. 2(a), from which a cover, the balls, and the spring means are removed, and FIG. 4 is an exploded perspective view of a pipe and a guide member in the pretensioner of the embodiment.

As illustrated in FIGS. 3 and 4, the pretensioner 15 includes a pipe 17, and one end portion 17a of the pipe 17 is open. In the end portion 17a, a cutout portion 17b extending from the open end of the pipe 17 in the axial direction of the pipe 17 and a mounting flange portion 17c are provided. The end portion 17a of the pipe 17 is attached to a guide member 18. In this case, the mounting flange portion 17c is fitted in a mounting groove 18a provided in the guide member 18, and is retained by a retaining portion 18b provided in the guide member 18. Further, in a state in which the end portion 17a of the pipe 17 is attached to the guide member 18 and the guide member 18 is attached to the side wall 8b of the frame with a case base 22 being disposed therebetween, although not illustrated, one part of the mounting flange portion 17c is retained in an upward orientation by a rectangular small aperture provided in the side wall 8b, and the other part of the mounting flange portion 17c is retained in an upward orientation by the retaining portion 18b of the guide member 18. This prevents the pipe 17 from coming out of the guide member 18 in the upward direction.

The guide member 18 has a guide face 18c. This guide face 18c includes a linear guide face portion 18d and a guide face portion 18e that is provided in contact with the linear guide face portion 18d and that is shaped like an arc of a circle concentric or substantially concentric with the rotation axis of the spool 9. As illustrated in FIG. 3, in a state in which the end portion 17a of the pipe 17 is attached to the guide member 18, the linear guide face portion 18d is located on an extension line of an inner peripheral face 17d of the pipe 17 serving as a cross section taken along a plane in the axial direction passing through the radial center of the pipe 17.

Figure 5:
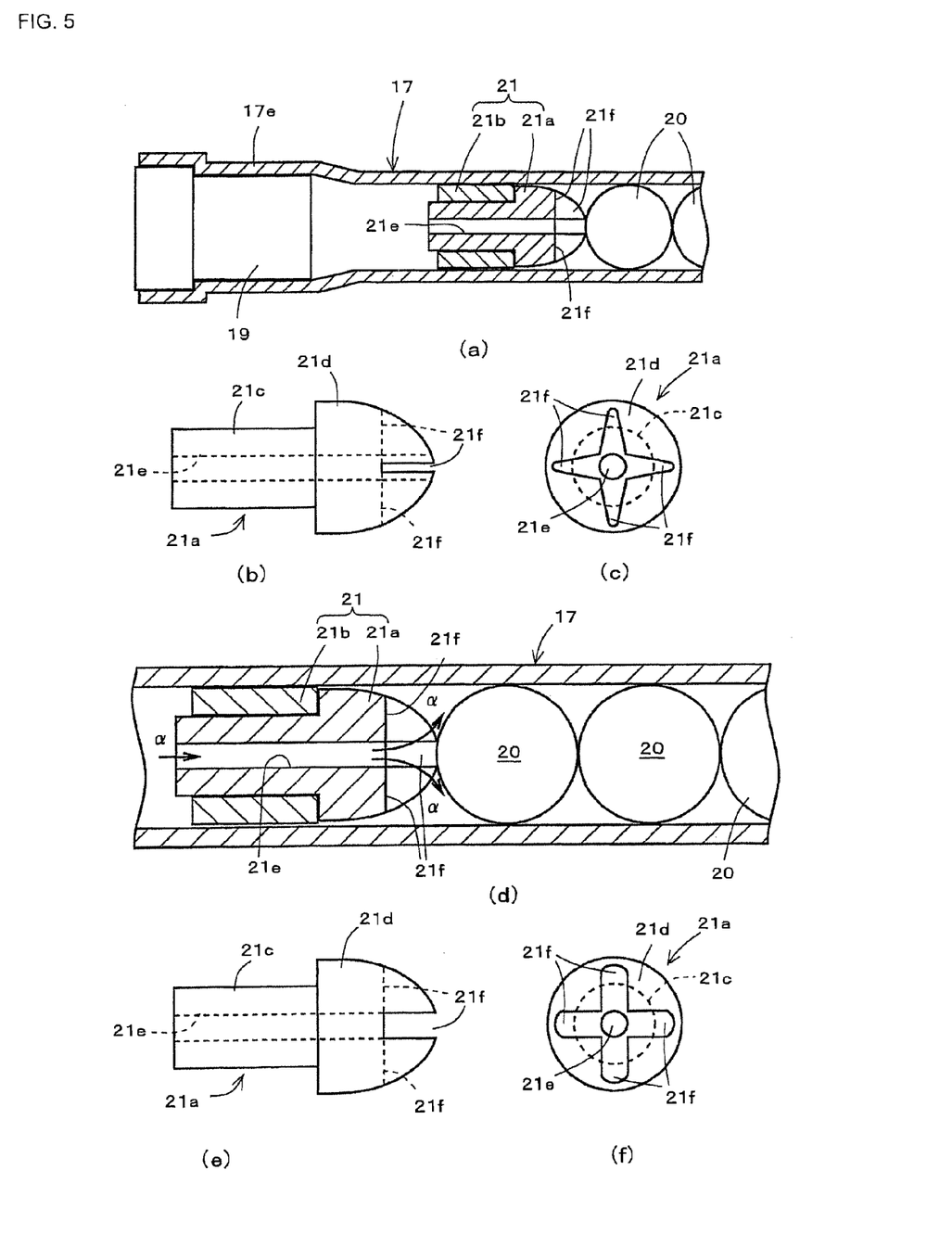
FIG. 5(a) is a partial cross-sectional view of a gas generator, a piston, and the balls in the pretensioner of the embodiment.
FIG. 5(b) is a front view of the piston.
FIG. 5(c) is a right side view of the piston.
FIG. 5(d) is an explanatory view of the piston during operation of the pretensioner.
FIG. 5(e) is a front view of a different example of a piston.
FIG. 5(f) is a right side view of the different example of the piston.

As illustrated in FIG. 5(a), a gas generator 19 for generating reaction gas is provided in the other end portion 17e of the pipe 17. Also, a predetermined number of balls 20 serving as the force transmission members of the present invention and formed of metal such as iron or aluminum, and a piston 21 for pushing the balls 20 by receiving gas pressure from the gas generator 19 are movably provided in the pipe 17. The piston 21 includes a piston body 21a formed of metal similarly to the balls 20, and a piston ring 21b formed of a nonmetallic material such as silicon or resin.

As illustrated in FIGS. 5(b) and 5(c), the piston body 21a includes a columnar shaft portion 21c provided on a gas generator 19 side, and a substantially hemispherical (that is, substantially spherical) head portion 21d provided on a ball 20 side. In this case, a radial center side of the substantially hemispherical head portion 21d protrudes from the outer peripheral side toward the balls 20. The shaft portion 21c and the head portion 21d are integrally formed, and an exhaust hole 21e penetrates the shaft portion 21c and the head portion 21d in the axial direction. Further, the head portion 21d has four exhaust grooves 21f arranged in a cross form a so as to communicate with the exhaust hole 21e. The width of the exhaust grooves 21f is set to be the largest at the centers thereof and to gradually decrease from the centers toward the leading ends. These exhaust grooves 21f prevent the exhaust hole 21e from being closed by the ball 20 in a state in which the head portion 21d of the piston body 21a is in contact with the ball 20. Therefore, even in the state in which the head portion 21d of the piston body 21a is in contact with the ball 20, the exhaust hole 21e and the exhaust grooves 21f allow the gas generator 19 side and the ball 20 side of the piston 21 to always communicate with each other. The exhaust hole 21e and the exhaust grooves 21f define an exhaust passage through which gas flows.

The piston ring 21b is cylindrical, and is fitted on the shaft portion 21c of the piston body 21a. The piston ring 21b is provided slidably on an inner peripheral face of the pipe 17 so as to hermetically or substantially hermetically seal the space between an outer peripheral face of the shaft portion 21c and the inner peripheral face of the pipe 17.

Gas generated by the gas generator 19 pushes the piston 21 to the right in FIG. 5(d). The piston 21 thereby pushes the balls 20 in the same direction. Further, as shown by arrow α in FIG. 5(d), the gas from the gas generator 19 can flow by a predetermined amount from the gas generator 19 side to the ball side of the piston 21 through the exhaust hole 21e and the exhaust grooves 21f. In this case, even in a state in which the head portion 21d of the piston body 21a is in contact with the ball 20, part of the gas can flow to the ball 20 side of the piston 21 through the exhaust grooves 21f.

As illustrated in FIGS. 5(e) and 5(f), the exhaust grooves 21f can be formed with a fixed width. Further, the number of exhaust grooves 21f of the piston 21 is not limited to four, and an arbitrary number of exhaust grooves 21f can be provided. When a plurality of exhaust grooves 21f are provided, it is preferable that the exhaust grooves 21f be equally spaced in the circumferential direction.

The pretensioner 15 includes the case base 22, and the case base 22 is attached to the side wall 8b. The guide member 18 is similarly attached to the side wall 8b of the frame 8 with the case base 22 being disposed therebetween. Further, the case base 22 and the guide member 18 are covered with a cover 23. The case base 22, the guide member 18, and the cover 23 define a case 24 of the pretensioner 15 having an inner space 24a.

As illustrated in FIGS. 2(b) and 3, in the inner space 24a of the case 24, a ring gear 25 is provided rotatably and movably to the right in FIG. 3 (FIG. 3 illustrates a state after the ring gear 25 is moved to the right). The ring gear 25 has a plurality of internal teeth 25a on an inner peripheral surface thereof.

A plurality of (seven in the illustrated example) levers 25b serving as the pressed portions of the present invention project from an outer peripheral surface of the ring gear 25. In a normal state in which the pretensioner 15 does not operate, the interval in the circumferential direction between the lever 25b that the first ball 20 first contacts and the lever 25b adjacent thereto in the clockwise direction is set such that part of one ball 20 can be received therebetween. Further, another interval in the circumferential direction between two adjacent levers 25b is set such that two balls 20 in contact with each other can be received in order therebetween. The levers 25b of the ring gear 25 can enter the pipe 17 from the cutout portion 17b at the end portion 17a of the pipe 17.

An annular pinion 26 is attached to the connecting member 14 of the seat belt retractor 3 so as to corotate with the connecting member 14 (although not illustrated, the spool 9 and the connecting member 14 can be integrally formed and the pinion 26 can be foamed integrally with the connecting member 14).

The pinion 26 has a plurality of external teeth 26a. The internal teeth 25a of the ring gear 25 can be meshed with the external teeth 26a of the pinion 26. During operation of the pretensioner 15, the balls 20 apply pressing force for the ring gear 25 to the levers 25b that have entered the pipe 17 from the cutout portion 17b of the pipe 17, and apply, to the ring gear 25, a force such that the ring gear 25 moves straight toward the pinion 26.

In the pretensioner 15 of the embodiment, the pipe 17 is laid (piping) such that an end of the end portion 17a is located at the lowermost position in FIG. 3 in a state in which the pretensioner 15 is mounted in the vehicle body. In this case, the position of the end of the end portion 17a is somewhat higher than the rotation center of the pinion 26 (that is, the rotation center of the spool 9). With this, the balls 20 transmit the force to the levers 25b of the ring gear 25 almost in the tangential direction of the ring gear 25 and in the seat-belt retracting direction. As a result, the balls 20 most efficiently transmit the force to the ring gear 25.

In addition, the pipe 17 is bent at a substantially right angle above the frame 8, linearly and substantially horizontally extends toward the cabin outer side, is bent at a substantially right angle near a free end of the side wall 8b, linearly and substantially horizontally extends in the front-rear direction of the vehicle, is bent at a substantially right angle near the side wall 8a, and linearly and substantially horizontally extends toward the cabin inner side. Therefore, the gas generator 19 substantially horizontally extends toward the cabin inner side above a fixed end of the side wall 8a of the frame 8.

The case base 22 is provided with a case-base-side guide groove 27 that guides the balls 20. In this case, the case-base-side guide groove 27 is substantially shaped like an arc of a circle that is substantially concentric with the center of the ring gear 25 in the state of FIG. 3 in which the ring gear 25 is moved to the right and the internal teeth 25a are meshed with the external teeth 26a of the pinion 26. The case-base-side guide groove 27 is provided on an outer side of ends of the levers 25b of the ring gear 25 located at the position in FIG. 3. Therefore, the levers 25b do not enter the case-base-side guide groove 27. This case-base-side guide groove 27 is defined by a case-base outer peripheral guide wall 28 and a case-base inner peripheral guide wall 29 that form a pair. These outer and inner peripheral guide walls 28 and 29 are substantially shaped like an arc of a circle that is substantially concentric with the rotation center of the pinion 26.

Further, a case-base-side groove guide portion 29a that guides the balls 20 to the case-base-side guide groove 27 is provided at an upstream end of the case-base inner peripheral guide wall 29 along which the balls 20 move. The case-base-side groove guide portion 29a is formed as an inclined surface that is inclined inward from the tangent to the arc at the upstream end of the case-base inner peripheral guide wall 29. In the case base 22, a case-base-side ball guide groove 27a that guides the balls 20 to the case-base-side guide groove 27 is formed by the case-base-side groove guide portion 29a.

Figure 6:
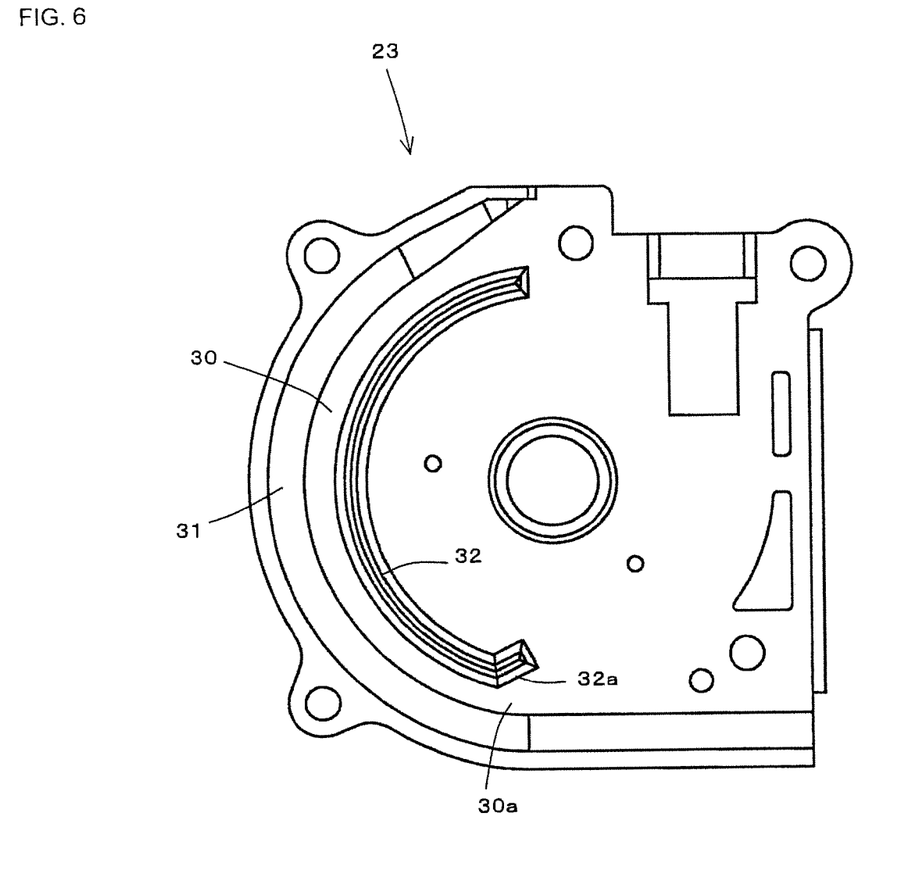
FIG. 6 illustrates an inner side of the cover in the pretensioner of the embodiment.

As illustrated in FIG. 6, the cover 23 is provided with a cover-side guide groove 30 that guides the balls 20. The cover-side guide groove 30 is defined by a cover outer peripheral guide wall 31 and a cover inner peripheral guide wall 32 that form a pair. In this case, the cover outer peripheral guide wall 31 is shaped like an arc of a circle that has almost the same diameter as that of the arc-shaped case-base outer peripheral guide wall 28 and that is concentric with the case-base outer peripheral guide wall 28, and the circumferential length of the cover outer peripheral guide wall 31 is set to be equal or substantially equal to the circumferential length of the case-base outer peripheral guide wall 28. Further, the cover inner peripheral guide wall 32 is shaped like an arc of a circle that has almost the same diameter as that of the arc-shaped case-base inner peripheral guide wall 29 and that is concentric with the case-base inner peripheral guide wall 29, and the circumferential length of the cover inner peripheral guide wall 32 is set to be equal or substantially equal to the circumferential length of the case-base inner peripheral guide wall 29.

In addition, a cover-side groove guide portion 32a that guides the balls 20 to the cover-side guide groove 30 is provided at an upstream end of the cover inner peripheral guide wall 32 along which the balls 20 move. This cover-side groove guide portion 32a is formed as an inclined face that is inclined inward from the tangent to the arc at the upstream end of the cover inner peripheral guide wall 32. In this case, the inclination angle of the cover-side groove guide portion 32a with respect to the tangent to the arc and the length of the cover-side groove guide portion 32a are set to be equal or substantially equal to the inclination angle of the case-base-side groove guide portion 29a with respect to the tangent to the arc and the length of the case-base-side groove guide portion 29a, respectively. In the cover 23, a cover-side ball guide groove 30a that guides the balls 20 to the cover-side guide groove 30 is formed by the cover-side groove guide portion 32a.

In a state in which the cover 23 is attached to and combined with the case base 22, the case-base outer peripheral guide wall 28 and the cover outer peripheral guide wall 31 are almost aligned, and the case-base inner peripheral guide wall 29 and the cover inner peripheral guide wall 32 are almost aligned, so that the case-base-side guide groove 27 and the cover-side guide groove 30 define an arc-shaped passage 33 through which the balls 20 move. Further, the case-base-side groove guide portion 29a and the cover-side ball guide groove 30a are almost aligned, so that the case-base-side groove guide portion 29a and the cover-side ball guide groove 30a define a guide passage 34 through which the balls 20 are guided to the above-described arc-shaped passage 33 after the balls 20 come out of the pipe 17 and rotate the ring gear 25.

In the pretensioner 15 of the embodiment, the arc-shaped passage 33, the guide passage 34, and a guide passage 35 provided between the guide face 18c of the guide member 18 and the ring gear 25 define a substantially arc-shaped ball receiving chamber along the outer periphery of the ring gear 25. In this case, the levers 25b of the ring gear 25 do not enter a portion of the ball receiving chamber defined by the arc-shaped passage 33 and the guide passage 34. As illustrated in FIG. 3, the guide member 18 has a stopper portion 18f, and the stopper portion 18f almost closes a downstream end of the arc-shaped passage 33. Further, a small ball receiving portion 36 that receives the balls 20 is provided below a portion of the guide passage 35 adjacent to the guide passage 34 in a manner such that the levers 25b of the ring gear 25 do not contact the balls 20. All of the arc-shaped passage 33, the guide passage 34, the guide passage 35, and the ball receiving portion 36 are provided in the case 24.

Operation of the seat belt retractor 3 of the embodiment having such a configuration will be described.

In the seat belt retractor 3 of the embodiment, the pretensioner 15 and the torsion bar 10 basically operate in the same manner as that of the pretensioner of the related art using a plurality of balls described in PTL 1 until the seat belt retractor 3 starts in the event of an emergency, such as a vehicle collision, when a great deceleration is applied to the vehicle and the spool 9 of the seat belt retractor 3 is rotated in the seat-belt retracting direction. Also, the EA operation of the torsion bar 10 is the same as the EA operation of the torsion bar of the related art.

Figure 7:
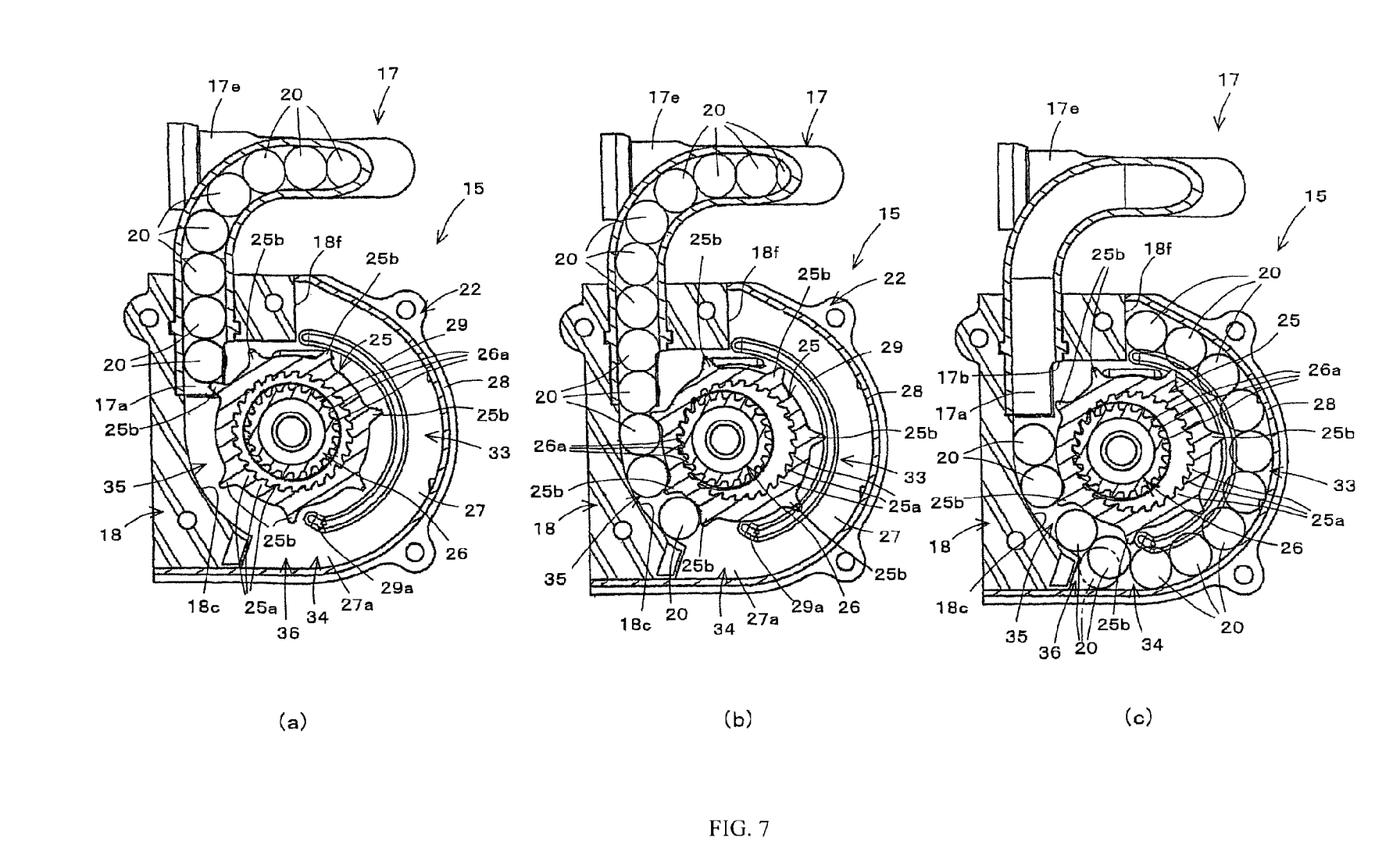
FIG. 7(a) illustrates a non-operation state.
FIG. 7(b) illustrates a state immediately after the operation starts.
FIG. 7(c) illustrates a state after the operation is completed.

As illustrated in FIG. 7(a), when the pretensioner 15 is in a non-operation state, the ring gear 25 is held substantially concentric with the pinion 26 so as not to rotate and move to the right, similarly to the pretensioner described in PTL 1. Therefore, the ring gear 25 is held in a state in which the internal teeth 25a are not meshed with the external teeth 26a of the pinion 26. Also, the first ball 20 is held in contact with one lever 25b. In this case, the first ball 20 can enter a small gap between the adjacent levers 25b. Further, the adjacent balls 20 of the first ball 20 and subsequent balls 20 are in contact with each other in the pipe 17. At this time, the gas generator 19 does not generate gas, and the balls 20 do substantially not press the levers 25b.

In the above-described event of the emergency, the deceleration detecting mechanism 13 and the lock mechanism 12 operate to lock the rotation of the locking base 11 in the seat-belt withdrawing direction, and the gas generator 19 operates to generate gas, in a manner similar to that adopted in the related art. Since the generated gas pushes the piston 21, the piston 21 applies a great push force to the ball 20 in contact therewith. Then, the piston 21 moves forward to the end portion 17a of the pipe 17 along the interior of the pipe 17 together with the balls 20 while pushing the balls 20. In this case, since the head portion 21d of the piston 21 is substantially hemispherical and the force transmission member is formed by the balls 20, the piston 21 relatively smoothly and rapidly moves in the curved pipe 17.

The push force of the piston 21 is transmitted from above to bottom via the balls 20 to the first ball 20 in contact with the ring gear 25. Then, the first ball 20 moves for itself, and moves the ring gear 25 to the right and rotates the ring gear 25 counterclockwise in FIG. 2(a) by the pushing force. Then, as illustrated in FIG. 7(b), the internal teeth 25a of the ring gear 25 mesh with the external teeth 26a of the pinion 26, and the pinion 26 starts to rotate in the same direction as that of the ring gear 25. In response to the start of rotation of the pinion 26, the spool 9 starts to be rotated in the seat-belt retracting direction via the pinion 26 and the connecting member 14, and retraction of the seat belt 4 worn by the occupant starts. In this case, the ring gear 25 is pushed down by the balls 20, whereby the ring gear 25 is pushed below the spool 9 via the pinion 26. In this case, since the spool 9 is pulled upward by the seat belt 4, the rotational resistance provided when the ring gear 25 rotates the pinion 26 and the spool 9 is relatively low.

When the first ball 20 is received in the small gap between the levers 25b and the next second ball 20 comes into contact with the lever 25b adjacent clockwise to the lever 25b that was in contact with the first ball 20, the pressing force applied to the lever 25b via the second ball 20 further rotates both the ring gear 25 and the pinion 26 counterclockwise. In this case, the pressing force applied from the first ball 20 to the lever 25b is substantially lost. Two balls, that is, the second and third balls 20 are received between the lever 25b that was in contact with the second ball 20 and the next lever 25b adjacent to that lever 25b in the clockwise direction while pressing the lever 25b. Further, when the fourth ball 20 next to the third ball 20 comes into contact with the next lever 25b, the pressing force applied to the next lever 25b via the fourth ball 20 further rotates both the ring gear 25 and the pinion 26 counterclockwise. In this case, the pressing force applied from the second and third balls 20 to the lever 25b is substantially lost. Subsequently, the balls 20 sequentially press the levers 25b, so that the ring gear 25 and the pinion 26 rotate counterclockwise. That is, the spool 9 rotates in the seat-belt retracting direction, and the seat belt 4 is wound around the spool 9.

As illustrated in FIG. 7(b), the first ball 20 whose pressing force to the lever 25b is substantially lost is moved along the guide passage 35 by the lever 25b with the rotation of the ring gear 25. As illustrated in FIG. 7(c), the first ball 20 enters the guide passage 34, separates from the lever 25b, and moves into the arc-shaped passage 33 along the guide passage 34. Similarly, the second and subsequent balls 20 whose pressing forces to the levers 25b are substantially lost sequentially move to the arc-shaped passage 33 along the guide passage 34. While moving through the guide passage 34 and the arc-shaped passage 33, the balls 20 do not contact the levers 25b of the ring gear 25. In other words, the rotation of the ring gear 25 is not influenced by the balls 20 located in the guide passage 34 and the arc-shaped passage 33, and the pressing forces from the balls 20 to the levers 25b are efficiently utilized for rotating the ring gear 25.

As shown by arrow α in FIG. 5(d), part of the gas generated by the gas generator 19 flows to the ball 20 side of the piston 21 through the exhaust hole 21e and the exhaust grooves 21f of the piston 21. This suppresses an excessive increase in pressure at the gas generator 19 side of the piston 21.

When the first ball 20 comes into contact with the stopper portion 18f or when the tension of the seat belt 4 for rotating the spool 9 in the seat-belt withdrawing direction becomes equal to the force of the balls 20 for rotating the spool 9 in the seat-belt retracting direction, the movement of the balls 20 stops, so that the rotations of the ring gear 25 and the pinion 26 stop and the operation of the pretensioner 15 stops. Therefore, winding of the seat belt 4 around the spool 9 by the operation of the pretensioner 15 is finished. As a result, the occupant is more firmly restrained by the seat belt 4.

Subsequently, the seat belt 4 is almost withdrawn by the inertia of the occupant, and the spool 9 is almost rotated in the seat-belt withdrawing direction. In this case, since the rotation of the locking base 11 in the seat-belt withdrawing direction is locked, the torsion bar 10 is subjected to torsional deformation. Since the spool 9 is rotated in the seat-belt withdrawing direction by the torsional deformation of the torsion bar 10, the force applied from the seat belt 4 to the occupant is limited. That is, the torsion bar 10 performs EA operation.

During EA operation of the torsion bar 10, the spool 9 rotates in the seat-belt withdrawing direction, and therefore, the ring gear 25 rotates in the same direction. Then, in FIG. 7(c), three balls 20 at the terminal end are returned toward the pipe 17 by the corresponding levers 25b with the rotation of the ring gear 25. However, the balls 20 from the fourth ball 20 from the terminal end to the ball 20 at the leading end (first ball 20 side) do not touch the levers 25b of the ring gear 25, and therefore, are not returned to the pipe 17. In this case, the fourth ball 20 from the terminal end is received in the ball receiving portion 36, as shown by a two-dot chain line in FIG. 7(c). The balls 20 closer to the leading end than the fourth ball 20 are unable to move to the pipe 17 because the fifth ball 20 adjacent to the fourth ball 20 and closer to the leading end comes into contact with the fourth ball 20, whereby backward movement of these balls 20 is prevented. That is, during the EA operation, some of the balls 20, that is, the three balls 20 at the terminal end are returned by the ring gear 25. Therefore, the influence of the balls 20 on the rotation of the ring gear 25 in the seat-belt withdrawing direction is suppressed. Since the influence of the balls 20 on the rotation of the ring gear 25 in the seat-belt withdrawing direction is thus suppressed during EA operation of the torsion bar 10, the ring gear 25 rotates more smoothly. As a result, the EA operation is effectively performed by the torsion bar 10.

Although not illustrated in FIG. 7(c), the piston 21 is also returned toward the gas generator 19 by the balls 20 that move toward the pipe 17. While the pressure in the pipe 17 on the gas generator 19 side of the piston 21 is increased by this movement of the piston 21, the gas in the pipe 17 on the gas generator 19 side flows to the ball 20 side of the piston 21 through the exhaust hole 21e and the exhaust grooves 21f of the piston 21, as shown by arrow α in FIG. 5(d). This suppresses the resistance of the gas to the movement of the piston 21. Since this allows more smooth movement of the piston 21, the ring gear 25 is also more smoothly rotated in the seat-belt withdrawing direction. Therefore, the EA operation of the torsion bar 10 becomes more effective.

According to the seat belt retractor of the embodiment, the piston 21 that pushes a plurality of balls serving as the force transmission member is provided with the exhaust hole 21e extending in the axial direction (moving direction of the piston 21), and the exhaust grooves 21f provided at the ball contact end of the piston 21. The exhaust grooves 21f extend in the radial direction (direction orthogonal to the axial direction), and communicate with the axial exhaust hole 21e. Therefore, during operation of the pretensioner 15, part of the gas pressure in the pipe between the gas generator 19 and the piston 21 flows toward the ball side of the piston 21 through the exhaust hole 21e and the exhaust grooves 21f. Thus, it is possible to suppress an excessive increase in gas pressure in the pipe between the gas generator 19 and the piston 21.

Since the piston 21 is also returned together with the balls 20 by the EA operation, the pressure in the pipe 17 on the gas generator 19 side of the piston 21 increases. However, the piston 21 is provided with the exhaust hole 21e and the exhaust grooves 21f, the gas in the pipe 17 on the gas generator 19 side can flow toward the ball 20 side of the piston 21 through the exhaust hole 21e and the exhaust grooves 21f. Therefore, the resistance of the gas to the return of the piston 21 can be suppressed. This allows more smooth movement of the piston 21, and also allows more smooth rotation of the ring gear 25 in the seat-belt withdrawing direction. As a result, the EA operation can be even more effectively performed by the torsion bar 10.

In addition, the exhaust passage formed by the exhaust hole 21e and the exhaust grooves 21f is provided only in the piston body 21a formed as a single member, but is not provided in the balls 20 serving as the force transmission member and the piston ring 21b. This simplifies the structure of the exhaust passage of the pretensioner 15, and facilitates the working process of the exhaust passage. As a result, the pretensioner 15 can be produced at low cost, and the cost of the seat belt retractor 3 having the pretensioner 15 can be reduced.

In this way, the pretensioner 15 using a plurality of balls 20 serving as the force transmission member and the torsion bar 10 serving as the energy absorption mechanism are effectively operated, the structure of the exhaust passage of the pretensioner 15 is simplified, and the working process of the exhaust passage is facilitated, so that it is possible to realize a seat belt retractor that can be produced at a lower cost.

In particular, by forming the exhaust grooves 21f of the exhaust passage at the end of the piston 21 to contact the ball 20 (that is, the head portion 21d), even when the ball 20 comes into contact with the head portion 21d of the piston 21, the exhaust grooves 21f prevent the exhaust hole 21e from being closed by the ball 20. Moreover, since it is only necessary to subject the end of the piston to grooving, the working process of the exhaust passage is even further facilitated.

Since the end of the piston 21 to contact the ball 20 is substantially spherical, even if the ball 20 comes into contact with the head portion 21d of the piston 21, the contact area between the ball 20 and the head portion 21d can be made considerably small. This more effectively prevents the exhaust hole 21e from being closed by the ball 20 when the ball 20 contacts the head portion 21d. Moreover, since the head portion 21d of the piston 21 is thus substantially spherical, the piston 21 can be even more smoothly moved in the curved pipe 17.

In addition, according to the seat belt apparatus 1 including the seat belt retractor 3 of the embodiment, since the seat belt retractor 3 can effectively operate the pretensioner 15 and the torsion bar 10 serving as the energy absorption mechanism, the occupant restraint performance of the seat belt apparatus 1 is enhanced effectively.

The seat belt retractor of the present invention is not limited to the above-described embodiment, and design variations are possible. For example, while the piston 21 is divided in two, that is, into the piston body 21a and the piston ring 21b in the above-described embodiment, the piston 21 can be formed by a single member without being divided. Further, while the end of the piston body 21a to contact the ball 20 is substantially spherical, the end of the piston body 21a can be shaped like a truncated cone whose radial center protrudes toward the ball side or be substantially planar. In short, design variations are possible within the scope of the matters described in the claims of the present invention.

Industrial Applicability

The seat belt retractor and the seat belt apparatus of the present invention can be suitably used in a seat belt retractor including a pretensioner using a plurality of balls serving as force transmission members and an EA mechanism, and a vehicle seat belt apparatus including this seat belt retractor.

The priority application, Japanese Patent Application No. 2009/283842, filed Dec. 15, 2009 including the specification, drawings, claims and abstract, is incorporated herein by reference in its entirety.

REFERENCE SIGNS LIST

1: seat belt apparatus
3: seat belt retractor
4: seat belt
6: tongue
7: buckle
8: frame
9: spool
10: torsion bar (energy absorption (EA) mechanism)
11: locking base
12: lock mechanism
13: deceleration detection mechanism
14: connecting member
15: pretensioner
17: pipe
18: guide member
18b: retaining portion
18c: guide face
19: gas generator
20: ball
21: piston
21a: piston body
21b: piston ring
21e: exhaust hole
21f: exhaust groove
22: case base
23: cover
24: case
25: ring gear
25a: internal tooth
25b: lever
26: pinion
26a: external tooth
27: case-base-side guide groove
27a: case-base-side ball guide groove
28: case-base outer peripheral guide wall
29: case-base inner peripheral guide wall
29a: case-base-side groove guide portion
30: cover-side guide groove
30a: cover-side ball guide groove
31: cover outer peripheral guide wall
32: cover inner peripheral guide wall
32a: cover-side groove guide portion
33: arc-shaped passage
34: guide passage
35: guide passage
36: ball receiving portion

What is claimed is:

1. A seat belt retractor comprising:
a seat belt;
a spool that retracts the seat belt;
a locking member that corotates with the spool in a normal state and that is inhibited from rotating in a seat-belt withdrawing direction in the event of an emergency so as to produce relative rotation with respect to the spool;

a lock mechanism that locks the rotation of the locking member in the seat-belt withdrawing direction in the event of the emergency;

an energy absorption mechanism that is provided between the spool and the locking member and that limits a load applied to the seat belt during the relative rotation between the spool and the locking member; and a pretensioner that operates in the event of the emergency so as to rotate the spool in a seat-belt retracting direction, wherein the pretensioner includes at least a case, a pipe attached to the case, a predetermined number of balls that are movably provided in the pipe and that transmit a force for rotating the spool in the seat-belt retracting direction, a gas generator that generates gas in the event of the emergency, a piston that is movably provided in the pipe and that is moved by pressure of the gas so as to push the balls, a ring gear that is at least rotatably provided in the case and that has a plurality of internal teeth on an inner periphery and a plurality of pressed portions on an outer periphery, the pressed portions being pressed by the balls, and a pinion that is provided at a spool side member in the case, that has external teeth to be meshed with the internal teeth, and that rotates the spool, wherein the piston includes an exhaust passage that allows a side of the piston close to the gas generator to communicate with a side of the piston close to the balls, wherein the exhaust passage is defined by an exhaust hole extending in an axial direction of the piston, and an exhaust groove provided at an end of the piston in contact with the balls and extending in a radial direction of the piston, the exhaust groove communicating with the exhaust hole, and wherein the piston includes a piston body and a cylindrical piston ring fitted on a shaft portion of the piston body, an axial direction length of the piston ring is shorter than an axial direction length of the shaft portion, and the exhaust passage is provided in the piston body.

2. The seat belt retractor according to claim 1, wherein the end of the piston in contact with the balls has any one of a substantially spherical shape, a truncated conical shape, and a substantially planar shape.

3. A seat belt apparatus comprising:

a seat belt retractor that retracts a seat belt; a tongue slidably supported by the seat belt withdrawn from the seat belt retractor; and a buckle by which the tongue is disengageably retained, the buckle being provided in a vehicle body, wherein the seat belt retractor is the seat belt retractor according to claim 1.

4. The seat belt apparatus according to claim 3, wherein the end of the piston in contact with the balls has any one of a substantially spherical shape, a truncated conical shape, and a substantially planar shape.

* * * * *